United States Patent

McLarty

[15] 3,635,256
[45] Jan. 18, 1972

[54] WEAR-RESISTANT TUBE
[72] Inventor: Jack Lowrie McLarty, Milwaukee, Wis.
[73] Assignee: Universal Oil Products Company, Des Plaines, Ill.
[22] Filed: Mar. 2, 1970
[21] Appl. No.: 15,474

[52] U.S. Cl..............................138/144, 138/177, 308/238
[51] Int. Cl............................................................F16l 9/14
[58] Field of Search..................138/144, 140, 145, 177, 137; 252/12, 12.2; 308/238

[56] References Cited

UNITED STATES PATENTS 2,884,010  4/1959  Fischer...................................138/144
3,286,737  11/1966  Kelly......................................138/144
3,451,433  6/1969  Cunningham..........................138/144
3,481,369  12/1969  De Ganahl.............................138/144
3,523,078  8/1970  Korshak..................................252/12
3,523,079  8/1970  Boes.......................................252/12
3,530,068  9/1970  Korshak..................................252/12

Primary Examiner—Herbert F. Ross
Attorney—James R. Hoatson, Jr. and Philip T. Liggett

[57] ABSTRACT

A wear-resistant tube having a smooth inner wall and constructed of layers of helically wound glass filaments and finely divided particles of copper at the surface of the smooth inner wall bonded together in a thermosetting resin system.

12 Claims, 2 Drawing Figures

PATENTED JAN 18 1972

3,635,256

INVENTOR
Jack Lowrie McLarty

BY: James R. Hoatson, Jr.
Philip T. Liggett
ATTORNEYS

WEAR-RESISTANT TUBE

This invention relates to a wear-resistant tube having a smooth inner wall. The tube is constructed of layers of helically wound glass filaments and finely divided particles of copper at the surface of the smooth inner wall bonded together in a thermosetting resin system.

Wear-resistant tubes, sometimes called self-lubricating tubes, are currently widely used in industry as pneumatic cylinders, hydraulic cylinders, and in other piston-cylinder applications. Predominant among the conventional dry lubricants used in such tubes are: mica, molybdenum disulfide, and graphite. Particles of these substances provide a smooth wear-resistant surface which will withstand the repeated passage of a piston for more than a million cycles, when the particles either are dispersed in an interior gel coat layer of a filament wound tube or are dispersed in a thermosetting resin coating on glass filaments circumferentially wound to form a filament wound tube. To a less significant degree, tungsten disulfide, tungsten diselenide, selenium disulfide, molybdenum diselenide, and various other materials have been used as solid or dry lubricants in resin-bonded glass filament wound tubes.

Particles of copper have never been used as a dry lubricant in a wear-resistant tube, however, The initial use of copper for this purpose is the subject of this invention and is described herein. The points of novelty of this invention reside in the incorporation of copper as a dry lubricant in the manufacture of otherwise conventional wear-resistant tubes.

It is a primary object of this invention to produce a self-lubricating tube which wears less and retains its dimensional tolerance longer than conventional self-lubricating filament wound tubes. The surface of a smooth inner wall of a tube in which particles of copper are dispersed in a thermosetting resin system shows less wear after prolonged use than do surfaces in which particles of conventional dry lubricants are dispersed. At the same time, tubes containing copper particles in their interior surface layers are sufficiently self-lubricating to withstand prolonged use equivalent to that available in tubes utilizing conventional dry lubricants.

In a broad aspect this invention is a wear-resistant tube having smooth inner wall and comprising layers of helically wound glass filaments and finely divided particles of copper at the surface of said smooth inner wall bonded together in a thermosetting resin system. In another sense this invention is, in a wear-resistant tube having a smooth inner wall and having layers of helically wound glass filaments bonded together in a thermosetting resin system, the improvement comprising a smooth inner wall formed of a thermosetting resin matrix containing finely divided particles of copper held in said resin matrix.

The thermosetting resins used in the formation of the tube of this invention may be any of the conventional thermosetting resins currently used for this purpose. While epoxy or polyester resins are normally used to form the tubes of this invention, other resins which form resin matrices with the equivalent bonding characteristics may be used. For example, phenol-formaldehyde resins or silicone resins are contemplated as being appropriate for use in this invention.

In a thermosetting resin system utilizing an epoxy resin, the epoxy resin is normally a conventional epoxy resin derived from epichlorohydrin and biphenol A, but may be any type of epoxy resin. The hardening agent in such a resin system may be any of the conventional hardeners, which include primary aliphatic polyamines, modified primary aliphatic polyamines, cyclic aliphatic amines, arometic amines, tertiary amines, latent curing agents, polyamides, and acid anhydrides.

When a polyester resin is used, it is normally derived from the reaction of dicarboxylic acid with a dihydric alcohol. To the polyester resin is added a hardening agent, which is normally a reactive monomer. Styrene is the most commonly used reactive monomer, although other monomers sometimes used include diallyl phthalate, diallyl isophthalate, and triallyl cyanurate. Peroxide catalysts are generally used in the final copolymerization reaction to form the thermosetting resin system. Pigments may be incorporated into all resin systems using the above components to impart the desired colors, but the characteristic gold color of the particles of copper predominates in those portions of the thermosetting resin matrix in which the particles of copper are present.

One preferred embodiment of this invention is a tube having a wear-resistant inner surface comprising an interior gel coat layer of a first thermosetting resin system in which finely ground copper particles are dispersed, and an exterior layer of glass filaments bonded together in a second thermosetting resin system and overwound about and bonded to said interior layer. The first thermosetting resin system used in the gel coat layer is preferably either a polyester resin and a hardening agent or an epoxy resin and a hardening agent. Similarly, the second thermosetting resin system is preferably either a polyester resin and a hardening agent or an epoxy resin and a hardening agent. Normally, the first and second thermosetting resin systems utilize the same resin in order to improve the bond between the gel coat layer and the exterior layer of glass filaments, and frequently the first and second thermosetting resin systems are identical.

Another tube which achieves the desired objects of this invention is characterized as having an inner layer of helically wound glass filaments formed by a band of filaments wound at a helical pitch no greater than the width of the band of filaments. Alternatively, a single glass filament may be substituted for the band of filaments and wound at a helical pitch equal to the diameter of the filament. This type of tube construction is known as "single-pass converage," since the inner surface of the tube is formed during a single pass of a filament distributing arm along the length of a rotating mandrel. The distinctive feature of a tube utilizing single-pass coverage at the inner surface is that there are no filament crossovers in a given layer.

One very useful product which is contemplated by this invention is a cylinder for accommodating a reciprocating piston comprising layers of helically wound glass filaments and finely divided particles of copper at the surface of a smooth inner wall bonded together in a thermosetting resin system.

The features of this invention may be more fully illustrated by reference to the accompanying drawings.

Figure 1:
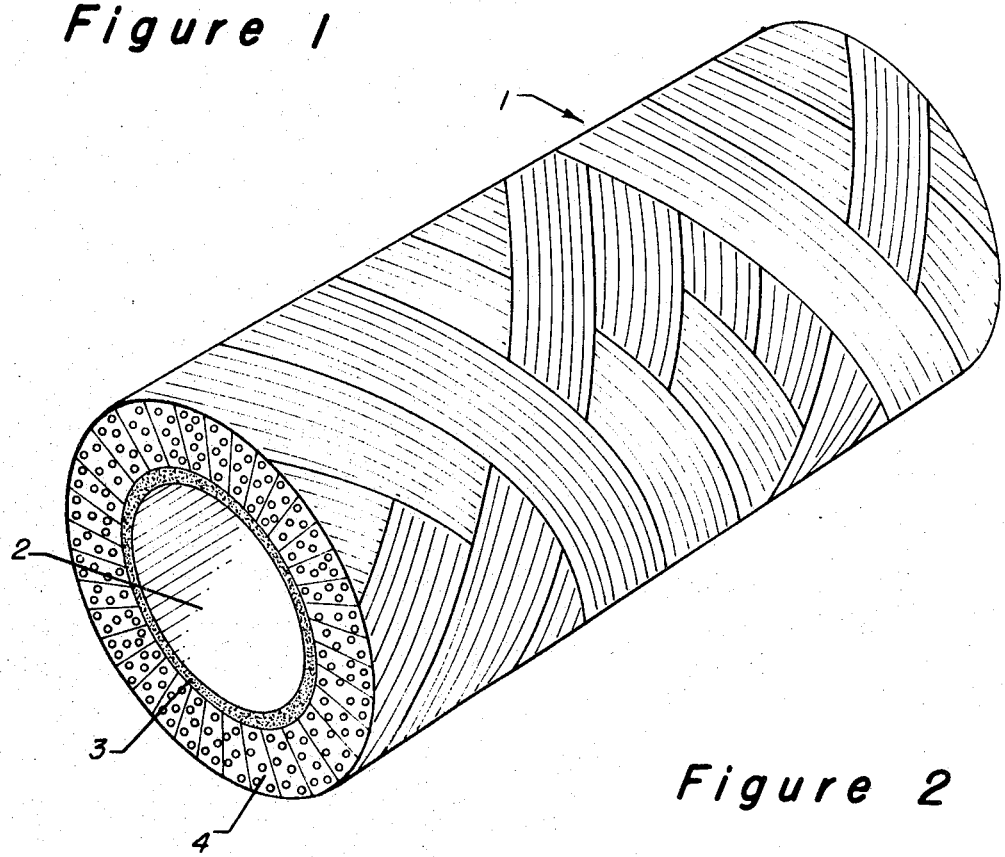
FIG. 1 is a perspective view of a section of a preferred embodiment of the tube of this invention.

Referring now to FIG. 1 there is shown a wear-resistant tube 1 having an inner gel coat layer 3. This inner gel coat layer is formed from a hardened thermosetting resin matrix comprised of a mixture of an epoxy resin and triethylenetetramine. The resin matrix contains finely divided particles of copper trapped therein. The copper used has a particle size of from 5 to 30 microns and is sold commercially as Klondike Superfine Copper, No. B-3786, by Baer Brothers Bronze Powder. The particles of copper are uniformly distributed throughout the gel coat layer 3. Since the gel coat layer 3 is surrounded by an exterior layer 4 formed by a plurality of layers of helically overwound glass filaments, the particles of copper are concentrated near the smooth inner wall 2 of the tube.

To construct the wear-resistant tube 1, a mandrel, such as commonly used in the art of filament winding, is cleaned with a solvent such as toluene. This is done by wiping down the mandrel with a cotton cloth soaked in toluene with special attention given to removing residual deposits or bits of resin from previous winding operations. Thereafter, the mandrel is coated with a conventional release agent, such as a silicone grease having a rated consistency of about SAE-90. This silicone grease is diluted to about a 10 percent mixture in toluene, and is applied to the mandrel in diluted form to insure a homogenous coating. Thereafter, the toluene is allowed to evaporate leaving a uniform coating of the resin release agent on the mandrel. The mandrel is then coated with a gel coat material comprised of particles of finely ground copper dispersed in a first thermosetting resin system. The coating is normally achieved by spraying the gel coat material onto the mandrel while the mandrel is maintained at a temperature of from about 200° F. to about 225° F. until a gel coat 5 to 10 mils in thickness is formed on the mandrel. As previously mentioned, the first thermosetting resin system, or matrix, is comprised of an epoxy resin and triethylenetetramine mixed in conventional proportions. The dispersed particles of copper comprise about 10 percent of the gel coat material by weight. After coating the mandrel, the first thermosetting resin system is cured, thereby forming the interior gel coat layer 3. The gel coat layer is allowed to cure at room temperature for about 45 minutes prior to being overwound with glass filaments. Alternately the gel coating operation can be at 150°–180° F. and partially cured prior to being overwound with glass filaments. After the gel coat layer 3 is cured, it is often helpful to sand the gel coat lightly with light sandpaper. This improves the adhesion between the gel coat layer 3 and the subsequent exterior layer 4 comprised of layers of glass filaments.

Filament overwrapping is carried out in the conventional manner. That is, the coated mandrel is positioned in a filament winding machine and is rotated while an axially reciprocating distributing arm overwinds a band of glass filament onto the coated mandrel. Before winding, the band of glass filaments is first passed through a resin bath containing a second thermosetting resin system or matrix which forms a coating on the glass filaments. This resin system is preferably a conventional epoxy resin system comprised of an epoxy resin and a hardening agent, such as diethylenetriamine, or any other conventional epoxy hardening agent. To the second thermosetting resin system is added black pigment for coloring to the extent of about 1 percent of the resin system by weight. When several filament thicknesses have been helically overwound, filament winding is discontinued and the second thermosetting resin system is cured by heating for about 4 hours at a temperature of about 212° F. The second thermosetting resin system coating on the glass filaments thereby bonds the glass filaments together and forms an exterior layer 4 bonded to the interior layer 3. The interior and exterior layers together form a preferred embodiment of the tube of this invention. The tube is then ready for use.

Figure 2:
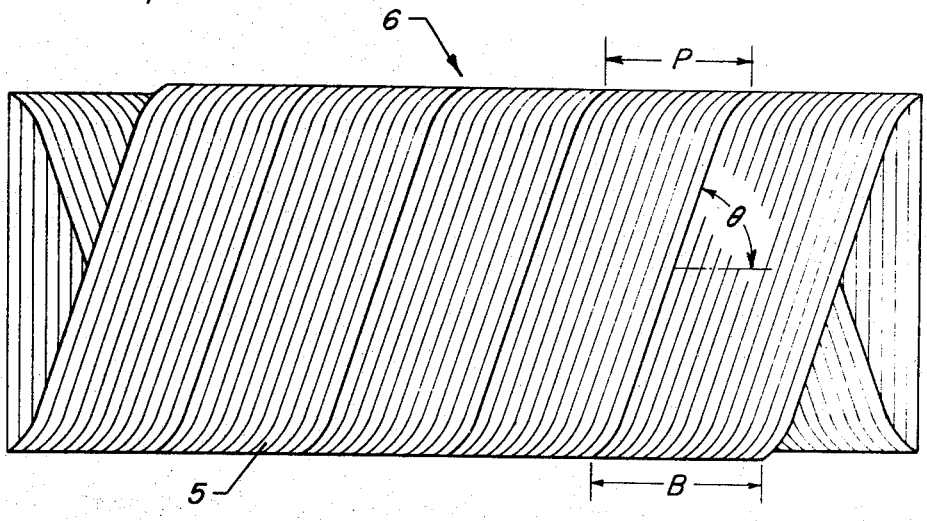
FIG. 2 is an elevational view of an alternative embodiment of the tube of this invention.

The tube 6 of FIG. 2 is constructed having an inner layer of helically wound glass filaments formed by a band 5 of filaments wound at a helical pitch P no greater than the width B of the band of filaments. The glass filaments are impregnated throughout with a thermosetting resin system within which particles of copper are uniformly distributed. While the angle of helical winding is frequently decreased after the initial formation of the inner layer or layers of filaments, the initial winding angle $\theta$ in FIG. 2 is retained throughout the formation of tube 6. Ideally, the band 5 of filaments should be wound at a pitch equal to the bandwidth B. The adjacent loops of band 5 would neither overlap nor would there be interstitial gaps between adjacent loops of band 5. In such a case, the mandrel about which tube 6 is formed would be covered by a continuous laminar layer of glass filaments at the end of a single pass of a distributing arm along the length of a mandrel. As a practical matter, however, it is very difficult to get each loop of the filament band to meet each adjacent loop of the filament band exactly without leaving interstitial spaces therebetween. Such spaces are to be avoided if at all possible, so each successive loop of the band 5 of glass filaments slightly overlaps the previous loop. The pitch P of winding of the band 5 of the glass filaments is therefore slightly less than the bandwidth B.

To produce the tube 6, a polyester resin system is produced by mixing in relative proportions by weight 5.75 parts diethylene glycol, 4 parts maleic anhydride, 1 part finely divided metallic copper, and 2 parts of phthalic anhydride. These materials are stirred thoroughly and placed in a vat which is to serve as a resin bath. Thereafter, 3 parts of styrene, 0.15 parts benzyl peroxide, and 0.0036 parts cobalt naphthanate are added to the resin mixture.

A cylindrical steel mandrel is coated with a conventional resin release agent to prevent the coated glass filaments from adhering to the mandrel. Thereafter, glass filaments are passed into the vat containing the polyester thermosetting resin system and are submerged in the resin, thereby becoming coated with the resin and the finely divided particles of copper. The motion of the filaments in passing through the vat tends to keep the particles of copper in suspension and insure a homogenous distribution of the particles of copper throughout the resin. The glass filaments are withdrawn from the vat and are helically wound about the cylindrical mandrel at a pitch P once the mandrel has begun to rotate. As the glass filaments are fed onto the mandrel, they are positioned in a flat band 5 which forms adjacent loops as it is helically wound onto the mandrel. A band 5 of glass filaments is wound into a first layer about the rotating mandrel in a single axial pass of the filament distributing arm along the length of the mandrel. After the first inner layer of glass filaments is formed, subsequent layers of glass filaments are helically overwound about the first layer in a continuous filament winding operation. A total of seven layers of glass filaments are overwound before winding is discontinued. The mandrel continues to rotate slowly for about 1 hour to prevent the resin from draining off. Thereafter, the mandrel and the tube 6 formed from the thermosetting resin system containing uniformly distributed particles of copper coated onto the glass filaments are removed from the filament winding machine. The thermosetting resin system is allowed to cure still further for about 1 day at room temperature to fully solidify and form a solid wear-resistant tube, and the mandrel is then removed. Alternatively, curing may be accelerated by heating the mandrel and tube 6 for several hours to cure the thermosetting resin system. The tube 6 produced has a smooth inner surface with an extremely high wear resistance as compared with resin-impregnated glass filament wound tubes formed in a conventional manner. The tube 6 is appropriate for use as a cylinder for accommodating a reciprocating piston in a pneumatic pump.

The foregoing detailed description and illustrations of the preferred embodiments of the improved tube of this invention have been set forth for the purpose of providing clarity and understanding only, and no unnecessary limitations should be construed therefrom as further modifications will be obvious to those skilled in the art of glass filament winding.

I claim as my invention:

1. A wear-resistant tube having a smooth inner wall and comprising layers of helically wound glass filaments and finely divided particles of copper at the surface of said smooth inner wall bonded together in a thermosetting resin system.

2. The tube of claim 1 further characterized in that an interior gel coat layer of an inner resin matrix forms said inner wall, and said particles of copper are uniformly distributed throughout said gel coat layer.

3. The tube of claim 1 further characterized in that said particles of copper are uniformly distributed throughout said resin system.

4. The tube of claim 1 further characterized in that an inner layer of helically wound glass filaments is formed by a filament wound at a helical pitch equal to the diameter of said filament.

5. The tube of claim 1 further characterized in that an inner layer of helically wound glass filaments is formed by a band of filaments wound at a helical pitch no greater than the width of said band of filaments.

6. The tube of claim 1 further characterized in that said particles of copper are concentrated near the inner wall of said tube.

7. A tube having a wear-resistant inner surface comprising an interior gel coat layer of a first thermosetting resin system in which finely ground copper particles are dispersed, and an exterior layer of glass filaments bonded together in a second thermosetting resin system and overwound about and bonded to said interior layer.

8. The tube of claim 7 further characterized in that said first thermosetting resin system used in said gel coat layer is a polyester resin and a hardening agent.

9. The tube of claim 7 further characterized in that said first thermosetting resin system used in said gel coat layer is an epoxy resin and a hardening agent.

10. The tube of claim 7 further characterized in that said second thermosetting resin system used in said exterior layer is a polyester resin and a hardening agent.

11. The tube of claim 7 further characterized in that said second thermosetting resin system used in said exterior layer is an epoxy resin and a hardening agent.

12. In a wear-resistant tube having a smooth inner wall and having layers of helically wound glass filaments bonded together in a thermosetting resin system, the improvement comprising a smooth inner wall formed of a thermosetting resin matrix containing finely divided particles of copper held in said resin matrix.

* * * * *